March 8, 1966   F. L. SAWYER   3,238,581
TOGGLE LATCH CONSTRUCTION
Filed June 12, 1964
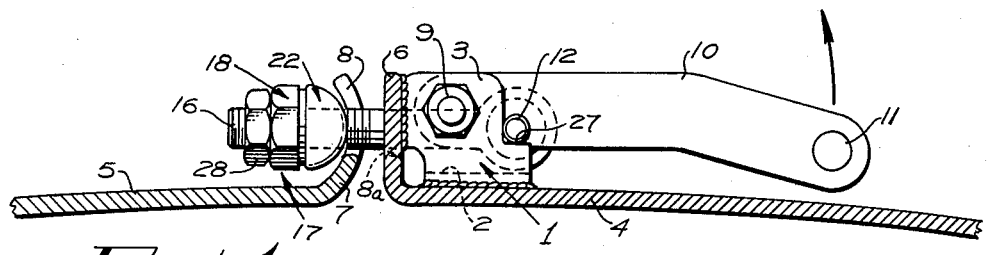
FIG. 1
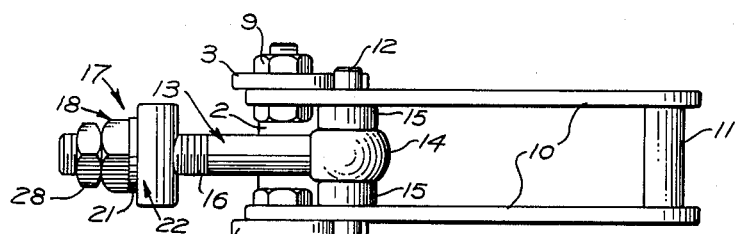
FIG. 2
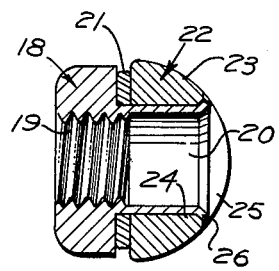
FIG. 4
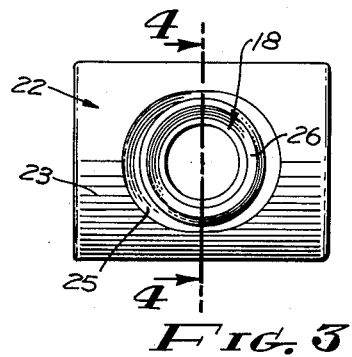
FIG. 3
INVENTOR.
FRANK L. SAWYER
BY
ATTORNEYS

United States Patent Office 3,238,581
Patented Mar. 8, 1966

3,238,581
TOGGLE LATCH CONSTRUCTION
Frank L. Sawyer, Canoga Park, Calif., assignor to Hartwell Corporation, Los Angeles, Calif., a corporation of California
Filed June 12, 1964, Ser. No. 374,591
6 Claims. (Cl. 24—71)

This invention relates to toggle latch constructions and included in the objects of this invention are:

First, to provide a toggle latch construction which incorporates a novel adjustment nut and crossbar unit wherein the adjustment nut and crossbar are rotatably connected so that, when the latch is disconnected, the crossbar member does not slide on the connecting shaft of the latch but is retained by the nut in its adjusted position.

Second, to provide, in a toggle latch, a nut and crossbar unit wherein the nut is provided with an extended sleeve on which the crossbar is rotatably retained, and wherein a washer is interposed between the nut and crossbar.

With the above and other objects in view as may appear hereinafter, reference is directed to the accompanying drawings, in which:

FIGURE 1 is a side view of the toggle latch construction and showing fragmentarily and in section a typical structure on which it is mounted.

FIGURE 2 is a top view of the toggle latch construction.

FIGURE 3 is an enlarged end view of the nut and crossbar unit; and

FIGURE 4 is a sectional view thereof taken through 4—4 of FIGURE 3.

The toggle latch construction includes a U-shaped bracket 1 having a base portion 2 and parallel side flanges 3. The bracket 1 is adapted to be attached, for example, by welding to a supporting structure 4 which may be a mounting strap or the wall of the container or any structure which is to be removably connected to a mating structure indicated by 5. The supporting structure and the mating structure may have confronting flanges 6 and 7 which are provided with aligned notches 8 and 8a.

The side flanges 3 are provided with fastening means 9 such as bolts which pivotally support a pair of handle arms 10 connected at their extremities by a crossbar 11. Near the axis of the fastening means 9 the handle arms are connected by a crosspin 12.

An eye bolt 13 is provided having a perforated end or eye 14 which journals on the crosspin 12 and is centered between washers 15. The eye bolt 13 also includes a shaft 16 screw-threaded at its extremity, and which is received in the notches 8 and 8a.

The shaft 16 receives a nut and toggle unit 17 which includes an adjustment nut 18 having internal screw threads 19. Extending axially from one end of the nut 18 is a journal sleeve 20 dimensioned to fit slidably on the shaft 16. The journal sleeve 20 receives a thrust washer 21 and a crossbar or bearing member 22.

In the construction illustrated, the crossbar is provided with a semi-cylindrical bearing surface 23 the axis of which is at right angles to the axis of the shaft 16. The bore 24 of the crossbar which fits the journal sleeve 20 is provided with a beveled end 25 intersecting the semi-cylindrical bearing surface 23. The corresponding extremity of the journal sleeve 20 is flared as indicated by 26 so as to retain the crossbar 22 and washer 21 and permit these members to journal on the sleeve 20.

The toggle latch construction is employed as follows:

When the toggle latch is in its latching position, the crossbar 22 is received in the notch 8 and the axis of the shaft 16 as well as the crosspin 12 is located in a plane offset from the axis of the fastening means 9 so that the handle arms 10 tend to rotate in the direction opposite from the arrow shown in FIGURE 1. Movement in this direction is limited by stop shoulders 27 incorporated in the side flanges 3 and engaged by the ends of the crosspin 12.

When it is desired to release the toggle latch the handle arms 10 are moved in the direction indicated by the arrow in FIGURE 1 which moves the eye bolt from its initially retracted position, past a center position, to an extended position, freeing the crossbar 22 from the keeper flange 7.

Inasmuch as the crossbar 22 remains attached to the adjustment nut 18 it is fixed axially on the eye bolt shaft, that is, it does not slide longitudinally thereon but remains in position for re-engagement with the keeper flange when the toggle latch is returned to its latching position shown in FIGURE 1.

In order to prevent unintenional change in the adjustment of the nut 18 a second nut or lock nut 28 is employed.

It will be observed that the nut and toggle unit is readily adjusted axially, when the latch is in its secured position shown in FIGURE 1, so that the desired constraining pull may be applied to the flanges and the structure connected therewith.

While the crossbar or bearing member 22 is shown as semi-cylindrical, it may be semispherical or conical and the margins of the slot 8 may be modified accordingly.

While the particular embodiments of the present invention have been shown and described, it will be obvious to those skilled in the art that changes and modifications may be made without departing from the invention in its broader aspects, and, therefore, the aim in the appended claims is to cover all such changes and modifications as fall within the true spirit and scope of this invention.

I claim:
1. A toggle latch construction, comprising:
   (a) an eye bolt having a screw-threaded shank;
   (b) means for moving said bolt between an extended and a retracted position;
   (c) a keeper for said bolt;
   (d) an adjustment nut screw-threaded on said bolt shank, said nut including a journal sleeve;
   (e) and a crossbar retained on said journal sleeve and engageable with said keeper.
2. A toggle latch construction, comprising:
   (a) an eye bolt having a screw-threaded shank;
   (b) means for moving said bolt between an extended and a retracted position;
   (c) a keeper for said bolt;
   (d) an adjustment nut screw-threaded on said bolt shank, said nut including a journal sleeve;
   (e) a crossbar journalled on said sleeve and axially movable with said nut on said bolt shank;
   (f) and a thrust washer on said sleeve and interposed between said nut and said crossbar.
3. An adjustment nut assembly adapted for screw-threaded attachment to a shaft, said assembly comprising:
   (a) a nut member having internal screw threads to fit said shaft and a journal sleeve extending axially thereof and flared at its extended end;
   (b) and a perforated crossbar journalled intermediate its ends on said sleeve and projecting radially therefrom and having bearing surfaces at opposite sides of said shaft for withstanding axial loads.
4. An adjustment nut assembly adapted for screw-threaded attachment to a shaft, said assembly comprising:
   (a) a nut member having internal screw threads to fit said shaft and a journal sleeve extending axially thereof and flared at its extended end;
(b) a perforated crossbar journalled intermediate its ends on said sleeve and projecting radially therefrom and having bearing surfaces at opposite sides of said shaft for withstanding axial loads;
(c) and a thrust washer journalled on said sleeve between said nut and said perforated member.

5. An adjustable nut for toggle latches, comprising:
(a) a nut member having an integral sleeve of smaller diameter than said nut member, said sleeve forming with said nut member an annular thrust shoulder, and extending axially therefrom a distance in excess of the thickness of said nut member, the extremity of said sleeve being flared;
(b) a bearing member journalled on said sleeve and beveled at its extremity to receive the flared extremity of said sleeve, said bearing member having a shoulder coextensive with and confronting the shoulder on said nut member;
(c) and a thrust element between said shoulders.

6. An adjustment nut as set forth in claim 5, wherein:
(a) said bearing member is a bar of semi-cylindrical cross-section.

References Cited by the Examiner

UNITED STATES PATENTS

| | | |
|---|---|---|
| 154,851 | 9/1874 | Dittman. |
| 940,510 | 11/1909 | Carnahan et al. ____ 285—365 X |
| 1,148,472 | 7/1915 | Adams _____ 24—271 X |
| 1,263,910 | 4/1918 | Sowell et al. |
| 1,479,679 | 1/1924 | Sandholm _____ 24—271 |
| 1,961,470 | 6/1934 | Winchester et al. ____ 85—50 X |
| 2,017,493 | 10/1935 | Glowacki _____ 85—50 X |
| 2,687,758 | 8/1954 | Pipes _____ 151—37 |
| 2,788,993 | 4/1957 | Oldham _____ 285—367 X |
| 3,154,829 | 11/1964 | Pahel et al. _____ 285—367 X |

FOREIGN PATENTS

| | | |
|---|---|---|
| 584,692 | 10/1959 | Canada. |
| 913,863 | 6/1946 | France. |

WILLIAM FELDMAN, *Primary Examiner.*

MILTON S. MEHR, *Examiner.*